United States Patent [19]

Oberhardt et al.

[11] Patent Number: 5,870,173
[45] Date of Patent: Feb. 9, 1999

[54] PROCESSING APPARATUS FOR FILM

[75] Inventors: Knut Oberhardt, Föching; Edmund Mangold, Ohlstadt; Bernhard Lorenz, Marzling, all of Germany

[73] Assignee: Agfa-Gevaert AG, Leverkusen, Germany

[21] Appl. No.: 878,993

[22] Filed: Jun. 19, 1997

[30] Foreign Application Priority Data

Aug. 13, 1996 [EP] European Pat. Off. ............ 96112989

[51] Int. Cl.$^6$ ................................. G03B 27/32
[52] U.S. Cl. ................... 355/27; 355/38; 355/68; 355/75; 396/567; 396/612
[58] Field of Search ............... 355/35, 38, 40, 355/41, 75, 68, 27, 28; 396/612, 620, 622, 567, 569

[56] References Cited

U.S. PATENT DOCUMENTS

| 4,279,502 | 7/1981 | Thurm et al. . |
| 4,627,719 | 12/1986 | Nitsch et al. . |
| 5,093,686 | 3/1992 | Shigaki . |
| 5,248,887 | 9/1993 | Oberhardt . |
| 5,251,840 | 10/1993 | Niedospial . |
| 5,303,000 | 4/1994 | Benker et al. . |
| 5,438,388 | 8/1995 | Arimoto et al. ............ 355/28 |
| 5,546,160 | 8/1996 | Kishi et al. ............... 355/27 |
| 5,614,986 | 3/1997 | Yoshikawa et al. .......... 355/75 |

FOREIGN PATENT DOCUMENTS

| 0 518 104 A1 | 12/1992 | European Pat. Off. . |
| 0 571805 A1 | 12/1993 | European Pat. Off. . |
| 664 483 A2 | 7/1995 | European Pat. Off. . |
| 0 672 938 A1 | 9/1995 | European Pat. Off. . |
| 0 677 771 A1 | 10/1995 | European Pat. Off. . |
| 0 724 187 A1 | 7/1996 | European Pat. Off. . |
| 3 437 222 A1 | 4/1986 | Germany . |
| 28 40 287 A2 | 10/1988 | Germany . |
| 40 38 661 A1 | 6/1991 | Germany . |
| OS 41 14 343 | 11/1992 | Germany . |

OTHER PUBLICATIONS

European Search Report No. EP 96 11 2989.

*Primary Examiner*—Alan A. Mathews
*Attorney, Agent, or Firm*—Darby & Darby

[57] ABSTRACT

An apparatus for processing film has two processing units and transport rollers for conveying film past the units. One of the units may include a scanning device and the other unit may include a copying device. Alternatively, the two units can comprise a prescanning device and a main scanning device, respectively. The apparatus further has a receiving station for film cartridges and at least one separate receiving station for film which is not confined in cartridges. Film can be fed to the transport rollers from either station.

20 Claims, 3 Drawing Sheets

PROCESSING APPARATUS FOR FILM

BACKGROUND OF THE INVENTION

The invention relates to the processing of photographic material.

The U.S. Pat. No. 5,251,840 illustrates a cartridge containing film which is wound onto a spool. The film has a guide section which is located within and does not project from the cartridge.

A processing laboratory for cartridges of this type is disclosed in the European Patent Application No. 664 483. Here, the film is withdrawn from the cartridge for copying and is afterwards rewound into the cartridge. The cartridge and the copies are then given to the customer.

The U.S. Pat. No. 5,093,686 proposes to rewind the film into the cartridge following development. The cartridge is thereafter placed in a copier which unwinds the film from the cartridge for copying and subsequently winds the film back into the cartridge.

In contrast to the above, films having the conventional small format are removed from the cartridges completely prior to development. Subsequent processing of the films, which are in the form of strips, is carried out independently of the cartridges.

The European Patent Application No. 677 771 describes a processing apparatus which can handle film cartridges as well as filmstrips without cartridges. A filmstrip introduced into the apparatus is first passed through a scanner and then through an exposure or copying station. On the other hand, a film cartridge is placed in a receptacle, and the film is then unwound from the cartridge and transported through the scanner. After being scanned, the leading portions of the film are temporarily stored behind the scanner as the trailing portions undergo scanning. When the entire film has been scanned, the film is wound back into the cartridge which is thereupon removed from the receptacle and placed in a second receptacle behind the scanner. The film is now unwound from the cartridge once more and transported through the copying station. Following copying, the leading portions of the film are temporarily stored behind the copying station while the trailing portions are copied. Upon completion of copying, the film is rewound into the cartridge.

The apparatus of the European Patent Application No. 677 771 is very expensive and difficult to operate.

SUMMARY OF THE INVENTION

It is an object of the invention to provide an apparatus which can be designed to process packaged and unpackaged photographic material relatively easily.

Another object of the invention is to provide an apparatus which can be designed to process packaged as well as unpackaged photographic material and yet have a relatively simple structure.

An additional object of the invention is to provide an apparatus which can be designed to process both packaged and unpackaged photographic material and can be manufactured relatively inexpensively.

A further object of the invention is to provide an apparatus which can be designed to process packaged as well as unpackaged photographic material automatically.

It is also an object of the invention to provide a method which enables both packaged and unpackaged photographic material to be processed in a single apparatus with relative ease.

Still another object of the invention is to provide a method which allows the same apparatus to automatically process packaged as well as unpackaged photographic material.

The preceding objects, and others which will become apparent as the description proceeds, are achieved by the invention.

One aspect of the invention resides in an apparatus for processing photographic material. The apparatus comprises a pair of processing units, means for transporting photographic material from a predetermined location to both of the processing units, and means for delivering photographic material to the predetermined location. The delivering means includes first means for directing photographic material to the predetermined location along a first path and second means for directing photographic material to the predetermined location along a second path.

The first directing means can comprise means for withdrawing photographic material from a container, e.g., a film cartridge. The second directing means may be devoid of such withdrawing means and can define a passage for photographic material in the form of strip. This construction allows the first directing means to handle packaged photographic material while permitting unpackaged photographic material to be handled by the second directing means.

The ability to manipulate photographic material supplied in different ways is particularly important for minilabs used to process film. These are frequently mounted in very confined quarters where no more than one minilab can be installed. Furthermore, minilabs must be virtually foolproof since they are often operated by personnel with little or no training. This can be accomplished by designing a minilab so that, once a film cartridge or unpackaged filmstrip is placed therein, all processing takes place automatically without the need to manually reposition the film at the end of a processing step.

To ensure that all frames of a film cartridge can be processed without pulling the film from its spool, the distance between the cartridge and the processing units should be equal to or less than a predetermined value. For current film cartridges, the distance between the first directing means and the more distant of the processing units should not exceed 119mm.

One of the processing units can include a prescanning device or prescanner while the other processing unit includes a main scanning device or main scanner. This is particularly useful for digital minilabs where the frames of a film are sensed electronically and then reproduced on copy material, e.g., copy paper, by a digital exposure unit such as a CRT or laser device. To sense an image, it is necessary to first determine the density range of the image in a prescanner in order to allow optimum adjustment of the operating range of the main scanner.

It is also possible for one of the processing units to comprise a device for measuring a characteristic of photographic material and for the other processing unit to comprise a copying device. This type of design is found in conventional nondigital minilabs. Here, the data derived from the measuring device is used to calculate exposures for the copying of film frames.

The photographic material may be passed through the processing units twice and one of the processing units can then be operative during each run. The film in a digital minilab is scanned by the prescanning device during a first run and by the main scanning device during a following run. On the other hand, in a conventional nondigital minilab, the measuring device collects data for the images of a film during one run while the images are copied in the copying device during a subsequent run.

The two runs during which the processing units are operative can take place in the same direction. However, time considerations make it advantageous for these runs to occur in opposite directions. The photographic material can then be removed from the apparatus immediately upon completion of the second run.

For film cartridges, operating errors can be reduced when the two runs during which the processing units are operative take place countercurrent to one another. This is due to the fact that film cartridges must always be handled in the same way. Thus, the film unwound from a cartridge for a processing operation must be wound back into the cartridge after the operation. Moreover, the cartridge itself remains in place throughout the processing operation, that is, the holder in which the cartridge is inserted prior to the processing operation is the same holder from which the cartridge is removed subsequent to the operation.

The first directing means may constitute, or constitute part of, a cartridge receiving station such as described in the U.S. Pat. No. 5,093,686. On the other hand, the second directing means may constitute, or constitute part of, a receiving station for conventional unpackaged filmstrips having a small format.

The cartridge receiving station may include a cartridge holder, and the holder is advantageously designed to accept a cartridge only when the cartridge has a predetermined orientation. This immediately eliminates errors in placing cartridges in the holder. If it is not possible to construct the holder in this manner, as may be the case when attempting to retrofit existing equipment, means for sensing cartridge orientation may be provided. The sensing means can be connected to a device for generating an alarm or other warning signal when a cartridge is placed in the holder in an improper orientation.

The receiving station for unpackaged filmstrips may likewise be provided with means for sensing orientation since a filmstrip can also be oriented incorrectly. For a filmstrip, it is necessary that the emulsion be oriented properly because copies made from the filmstrip will otherwise be reversed. The orientation of a filmstrip can, for instance, be detected via the DX code as disclosed in the U.S. Pat. No. 5,248,887. The sensing means for unpackaged filmstrips can again be connected to a device which generates an alarm or other warning signal when a filmstrip has an improper orientation.

A minilab can be combined with a film developing unit in such a manner that developed filmstrips are transferred from the developing unit directly into the minilab for copying. Here, it is of advantage to have a third receiving station for the filmstrips arriving from the developing unit.

The receiving stations may be located on a driven carriage which is preferably movable vertically. For a minilab equipped with a measuring device and/or a copying device which can be automatically adjusted to different film formats, operation of the minilab can occur in response to insertion of a cartridge or unpackaged filmstrip in the minilab. By way of example, if a cartridge is placed in the cartridge receiving station, the carriage is shifted so that the first directing means can transfer film from the cartridge directly to the transporting means which conveys material to the processing units. At the same time, one or both of the processing units is adjusted to the format of the film. This can be accomplished by shifting components of a processing unit or automatically interchanging an entire section of a unit, e.g., a platform for supporting the film.

The receiving stations may also be mounted at fixed locations. The directing means of the receiving stations are then preferably arranged so that the paths associated with the directing means are in permanent communication with the transporting means which conveys material to the processing units. Here, it is possible to dispense with drive means for changing the locations of the directing means.

Additional features and advantages of the invention will be forthcoming from the following detailed description of preferred embodiments when read in conjunction with the accompanying drawings.

DESCRIPTION OF THE PREFERRED EMBODIMENTS

Figure 1:
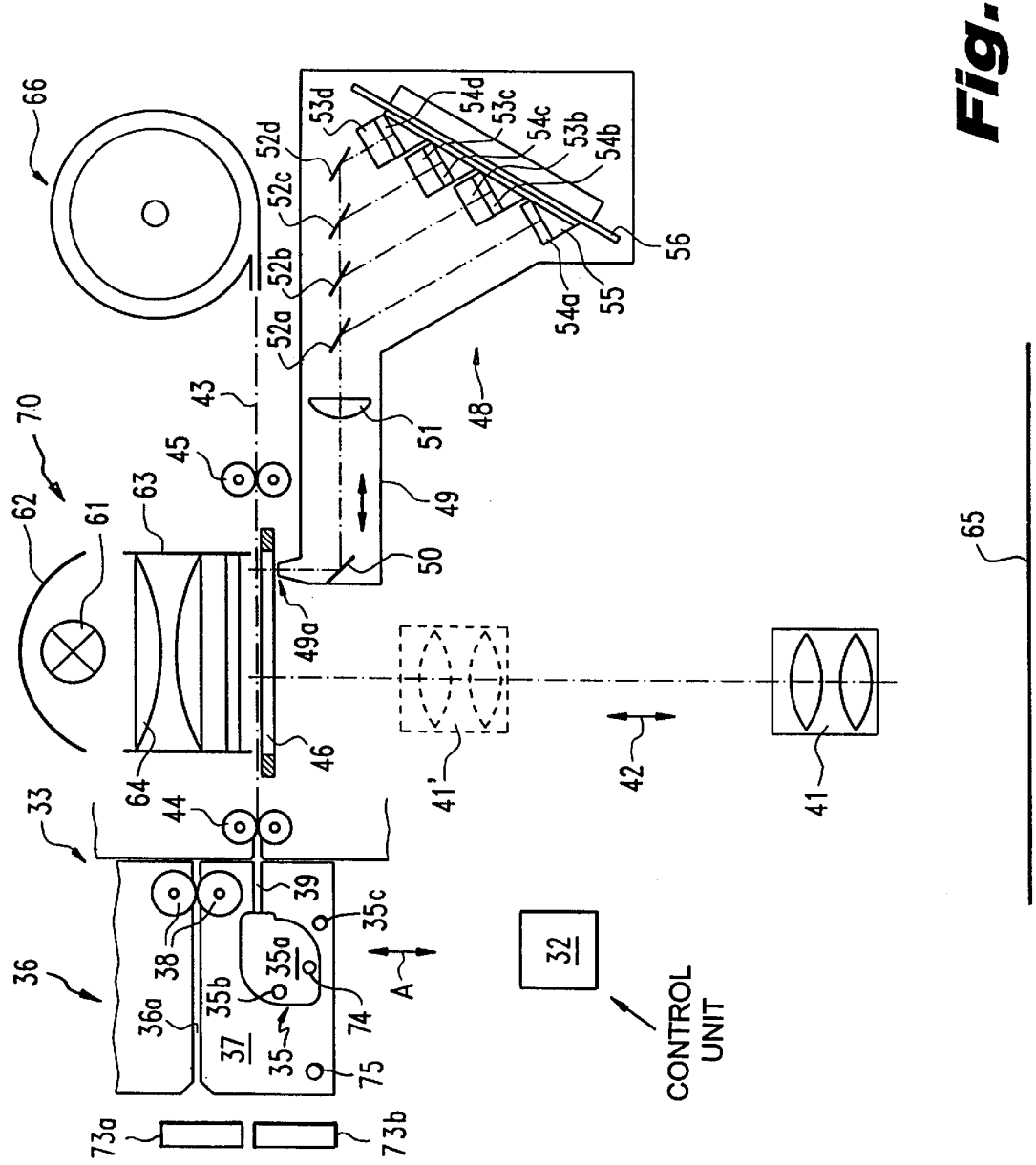
FIG. 1 schematically illustrates one embodiment of an apparatus according to the invention for processing photographic material.

FIG. 1 shows an apparatus in accordance with the invention for processing photographic material. The photographic material is here exposed and developed film 43. The film 43, which is transparent, consists of a series of frames or originals which are to be scanned and copied. To this end, the apparatus has a processing section which contains two processing units including a scanning device or unit 48 and a copying device or unit 70.

The copying device 70 comprises a masking plate or support 46 for the film 43, and the masking plate 46 defines a window on which a frame of the film 43 is positioned for copying. An objective 41 sharply focuses an image of the frame on a band of light-sensitive copy paper or material 65. The frame is transilluminated by a lamp 61 which constitutes a source of copy light and is located on the side of the masking plate 46 remote from the objective 41. Light from the lamp 61 is directed by a reflector 62 to a light shaft or tube 63 containing a condenser 64. The light travels from the condenser 64 to a diffusing disk and, from there, to the frame in the window 46.

The objective 41 is movable back-and-forth along the optical axis as indicated by the double-headed arrow 42. As the objective 41 is shifted, the magnification of the image on the copy paper 65 changes. When the objective 41 assumes the position 41' indicated by broken lines, the objective 41 is at its smallest distance from the masking plate 46. In the position 41', the image on the copy paper 65 has the greatest magnification.

The apparatus of FIG. 1 operates on the same principle as that described in the German Patent Publication No. 34 37 222. Thus, the film 43 is first transported from left to right past the copying device 70 and the scanning device 48. After passing by the scanning device 48, the film 43 is wound onto a reel or coiling device 66 which serves as a temporary storage unit for the film 43. During the run from left to right, each frame of the film 43 is scanned by the scanning device 48. Once all of the frames have been scanned, the direction of movement of the film 43 is reversed and the film 43 is transported from right to left in steps. The frames of the film 43 are copied in the copying device 70 during this second run which occurs counter to the original direction of movement.

The scanning device 48 measures a characteristic, e.g., the density, of the film 43 and generates values representative of the characteristic. These values are used to properly position the frames in the copying window of the masking plate 46 and to calculate the amounts of copy light.

The apparatus of FIG. 1 has a feeding device or unit 33 which is located on a side of the copying device 70 remote from the reel 66 and feeds a film to be scanned and copied towards the copying device 70. Transport rollers 44 are disposed between the feeding device 33 and the copying device 70 and grip the leading end of a film fed towards the copying device 70 by the feeding device 33. Upon gripping the leading end of a film, the transport rollers 44 convey the film towards the right on film guide edges. On the side of the copying device 70 remote from the transporting rollers 44 are additional transport rollers 45. The transport rollers 45 grip the film as it travels from the copying device 70 towards, and convey the film into, the reel 66.

The transport rollers 44 serve to convey a film from a location adjacent the feeding device 33 to the copying device 70 and the scanning device 48. Between the transport rollers 44 and the reel 66, the film travels along a horizontal path in a horizontal plane.

The scanning device 48 includes a lighttight housing 49 having an entrance slit 49a. During scanning, the slit 49a is situated below and faces the window in the masking plate 46. Light which has passed through a film frame to be scanned enters the scanning device 48 via the slit 49a. The scanning device 48 is movable from right to left and left to right as indicated by the double-headed arrow in the scanning device 48 so that the slit 49a can be positioned at different locations of the window. In FIG. 1, the slit 49a is disposed near the right-hand edge of the window.

Below and in register with the entrance slit 49a is a reflector 50 which is inclined at 45 degrees to the path of the film 43 through the copying device 70. Light entering the slit 49a and impinging on the reflector 50 is reflected by the latter into a horizontal path which parallels the path of the film 43. The reflected light travels through an objective 51 to a series of beam splitters 52a, 52b, 52c and 52d which are again inclined at 45 degrees to the path of the film 43 through the copying device 70. The beam splitters 52a–52d separate the light into red, green and blue components, and each of the beam splitters 52a–52d reflects a portion of the light downward to a respective row or linear array of measuring cells 54a, 54b, 54c and 54d.

The measuring cells 54a–54d have upper surfaces which face, and are impinged by the light coming from, the beam splitters 52a–52d. The objective 51 and the positions of the measuring cells 54a–54d are selected so that the image of a film frame in the window of the masking plate 46 is sharply focused on the upper surfaces of the measuring cells 54a–54d. Color filters 53b, 53c and 53d are disposed in front of the respective measuring cells 54b–54d, and each of the filters 53b, 53c, 53d sensitizes the associated measuring cell 54b, 54c, 54d to a respective one of the primary colors red, green and blue. The measuring cells 54a remain uncolored and generate a gray value which can be used for detection of the areas between neighboring film frames and for density determination.

The measuring cells 54a–54d are mounted on a stepped carrier 55 with their upper surfaces perpendicular to the incoming light. A plate 56 is directly connected to the carrier 55 and includes a copper foil with etched conductors. The conductors link the individual measuring cells of the rows 54a–54d to a non-illustrated logic unit such as a microprocessor which analyzes the values generated by the measuring cells 54a–54d.

The reflector 50, objective 51, beam splitters 52a–52d, filters 53b–53d, measuring cells 54a–54d, carrier 55 and plate 56 are all enclosed by the lighttight housing 49.

The feeding device 33, which functions to transfer films to the transport rollers 44, includes a receiving station 36 for unpackaged filmstrips and a receiving station 35 for packaged films. Packaged films can be confined in containers such as film cartridges and film magazines. It is assumed here that the receiving station 35 is designed to accept film cartridges.

The receiving station 35 comprises a receiving chamber 35a for film cartridges, a drive 35b for rotating the spool of a cartridge and a drive 35c for opening a cartridge. The receiving station 35 further comprises a slot-like passage or channel 39 which is designed as a guide for strips of film.

A detector 74 is mounted in the receiving station 35 and functions to sense the orientation of a film cartridge placed in the receiving chamber 35a. Should a cartridge be inserted in the receiving chamber 35a improperly, the detector 74 activates a warning element or alarm element 75 to advise the operator that this is the case.

The receiving station 36 likewise includes a slot-like passage or channel 36a which is designed as a guide for filmstrips. The receiving station 36 additionally includes drive rollers 38 which are disposed along, and are arranged to grip a filmstrip inserted in, the guide passage 36a.

The receiving stations 35, 36 are located on a carriage 37 which is movable back-and-forth vertically between a raised position and a lowered position as indicated by the double-headed arrow A. In the raised position of FIG. 1, the guide passage 39 of the receiving station 35 is aligned with the nip of the transport rollers 44. Film unwound from a cartridge by the spool drive 35b of the receiving station 35 can then be conveyed to the transport rollers 44 via the guide passage 39. When the carriage 37 assumes its lowered position, the guide passage 36a of the receiving station 36 is in register with the nip of the transport rollers 44. A filmstrip inserted in the guide passage 36a can now be fed to the transport rollers 44 by the drive rollers 38.

The spool drive 35b and the guide passage 39 constitute a means for directing or guiding a film from the receiving station 35 to the transport rollers 44. Similarly, the guide passage 36a and the drive rollers 38 constitute a means for directing or guiding a filmstrip from the receiving station 36 to the transport rollers 44.

A filmstrip can be introduced into the receiving station 36 while a film from the receiving station 35 is being scanned and/or copied. The leading end of the filmstrip is held stationary by the drive rollers 38 until the film from the receiving station 35 has been scanned, copied and rewound into its cartridge. The carriage 37, which was in its raised position during the processing of the film from the receiving station 35, can thereupon be moved to its lowered position and the drive rollers 38 activated to feed the filmstrip to the transport rollers 44.

The scanning and copying operations, as well as the movements of the carriage 37, are regulated by a central or main control unit 32. The main control unit 32 is connected with the motors for the carriage 37, the spool drive 35b, the cartridge opening drive 35c, the drive rollers 38, the transport rollers 44, 45, the reel 66, the objective 41 and the scanning device 48. The main unit 32 is also connected to an exposure control unit constituting part of the copying device 70 and to the logic unit for analyzing the values from the measuring cells 54a–54d.

The operation of the apparatus of FIG. 1 is as follows:

Assuming that an unpackaged filmstrip is to be copied, the scanning device 48 is moved to the illustrated position in which the entrance slit 49a is located adjacent the right-hand edge of the window in the masking plate 46. The position of the entrance slit 49a depends upon the format of the filmstrip which is here taken to be a small format. If necessary, the main control unit 32 moves the carriage 37 to its lowered position in which the guide passage 36a registers with the nip of the transport rollers 44. Once the guide passage 36a is in alignment with the nip of the transport rollers 44, the drive rollers 38 are set in motion to feed the filmstrip to the transport rollers 44 which, in turn, advance the filmstrip to the transport rollers 45. From the transport rollers 45, the filmstrip is fed into the reel 66.

As the filmstrip travels to the reel 66, the successive portions of the filmstrip passing over the entrance slit 49a of the scanning device 48 are scanned. Since the entrance slit 49a is elongated transverse to the direction of movement of the filmstrip, the portion of the filmstrip being scanned at any moment is in the form of a narrow strip extending transverse to the direction of movement. For each scanned portion of the filmstrip, the measuring cells 54a–54d generate a set of density values including a neutral density value as well as density values for each of the primary colors red, green and blue. The density values are sent to the logic unit which processes the same in accordance with the teachings of the U.S. Pat. No. 4,279,502. The respective sets of density values are processed in sequence, and the set of density values for any scanned portion of the filmstrip is processed separately from the sets of density values for the other scanned portions. When the trailing end of the filmstrip reaches the transport rollers 45, every frame of the filmstrip has been scanned and all the sets of density values for the filmstrip have been processed.

The logic unit uses the density values to calculate the amount of copy light in each of the primary colors for every frame of the filmstrip. It is assumed here that each frame of the filmstrip is of sufficiently good quality to be copied.

Once the trailing end of the filmstrip arrives at the transport rollers 45, the direction of rotation of the transport rollers 44,45 is reversed. The filmstrip is now conveyed in the opposite direction back towards the receiving station 36. During the backward travel of the filmstrip, each frame of the filmstrip is positioned over the window of the masking plate 46 and copied using the amounts of copy light calculated by the logic unit. Thus, the backward movement of the filmstrip is carried out in steps. The copying operation is completed when the trailing end of the filmstrip passes through the drive rollers 38.

If now a film in a cartridge is to be copied, the cartridge is placed in the receiving chamber 35a of the receiving station 35. Furthermore, the carriage 37 is moved to its raised position so that the guide passage 39 is in alignment with the nip of the transport rollers 44.

Assuming that the film in the cartridge has a different format than the filmstrip processed previously, the format of the window in the masking plate 46 is changed. This is preferably accomplished by changing the masking plate 46. A sensor detects the new masking plate and, if a change in magnification is required, the control unit 32 shifts the objective 41 appropriately in response to detection of such plate. The control unit 32 likewise positions the scanning device 48 so that the entrance slit 49a is disposed adjacent the right-hand edge of the window in the masking plate 46. Moreover, the control unit 32 activates the drive 35c for opening the cartridge and the drive 35b for rotating the spool of the cartridge. As a result, the leading end of the film in the cartridge is fed through the mouth of the cartridge to the transport rollers 44. Once the film has been gripped by the transport rollers 44, the drive 35b for the spool of the cartridge is deactivated. The film is now scanned as described earlier for the filmstrip while advancing in a direction from the receiving station 35 towards the reel 66. When all of the frames of the film have been scanned, the direction of movement of the film is reversed and the frames are copied as the film travels backwards. During the copying phase, the spool of the cartridge is subjected to a constant torque sufficient to wind the film back into the cartridge. The copying operation is complete once the entire film has been rewound into the cartridge and the latter has been closed.

The speed of the filmstrip and the film past the copying and scanning devices is regulated by the transport rollers 44, 45.

In FIG. 1, the entrance slit 49a of the scanning device 48 is located adjacent an edge of the window in the masking plate 46, and hence adjacent an edge of a film frame positioned on the window. However, if there is uncertainty regarding the illumination of such an area, the entrance slit 49a can be placed in another position for scanning. In particular, the scanning device 48 can be positioned so that the entrance slit 49a is in alignment with the optical axis. Prior to copying, the entrance slit 49a is returned to the right-hand edge of the window in the masking plate 46.

The scanning device 48 is farther removed from the receiving station 35, and hence from the mouth of a cartridge in the receiving chamber 35a of the station 35, than the copying device 70. Accordingly, it is possible to vary the distance between the receiving chamber 35a and the window of the copying device 70 as a function of the position of the entrance slit 49a during scanning. As the position of the entrance slit 49a during scanning shifts to the left, the distance between the receiving chamber 35a and the window of the copying device 70 can be increased.

Figure 2:
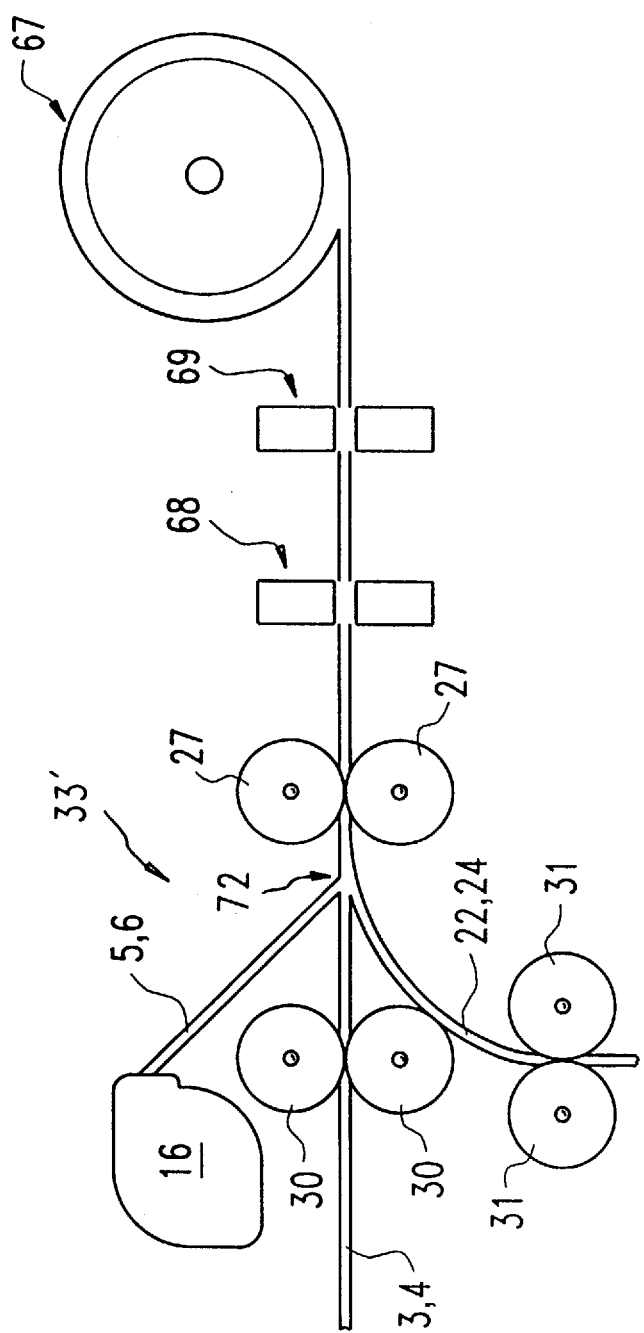
FIG. 2 schematically illustrates another embodiment of the apparatus.

FIG. 2 shows another embodiment of an apparatus according to the invention for processing photographic material. The photographic material is once more assumed to be exposed and developed film.

The apparatus of FIG. 2 again has a processing section with two processing units, and these processing units include a prescanning device or unit 68 and a main scanning device or unit 69. A feeding device or unit 33' for supplying photographic material to the prescanning and main scanning devices 68, 69 is disposed on a side of the prescanning device 68 remote from the main scanning device 69. Transport rollers 27 are located between the feeding device 33' and the prescanning device 68 while a reel or coiling device 67 for the temporary storage of film is situated on a side of the main scanning device 69 remote from the feeding device 33'. The transport rollers 27 function to convey a film from a location adjacent the feeding device 33' to the prescanning device 68 and the main scanning device 69.

The apparatus of FIG. 2 is particularly well-suited as a scanning arrangement for a digital minilab.

Figure 3:
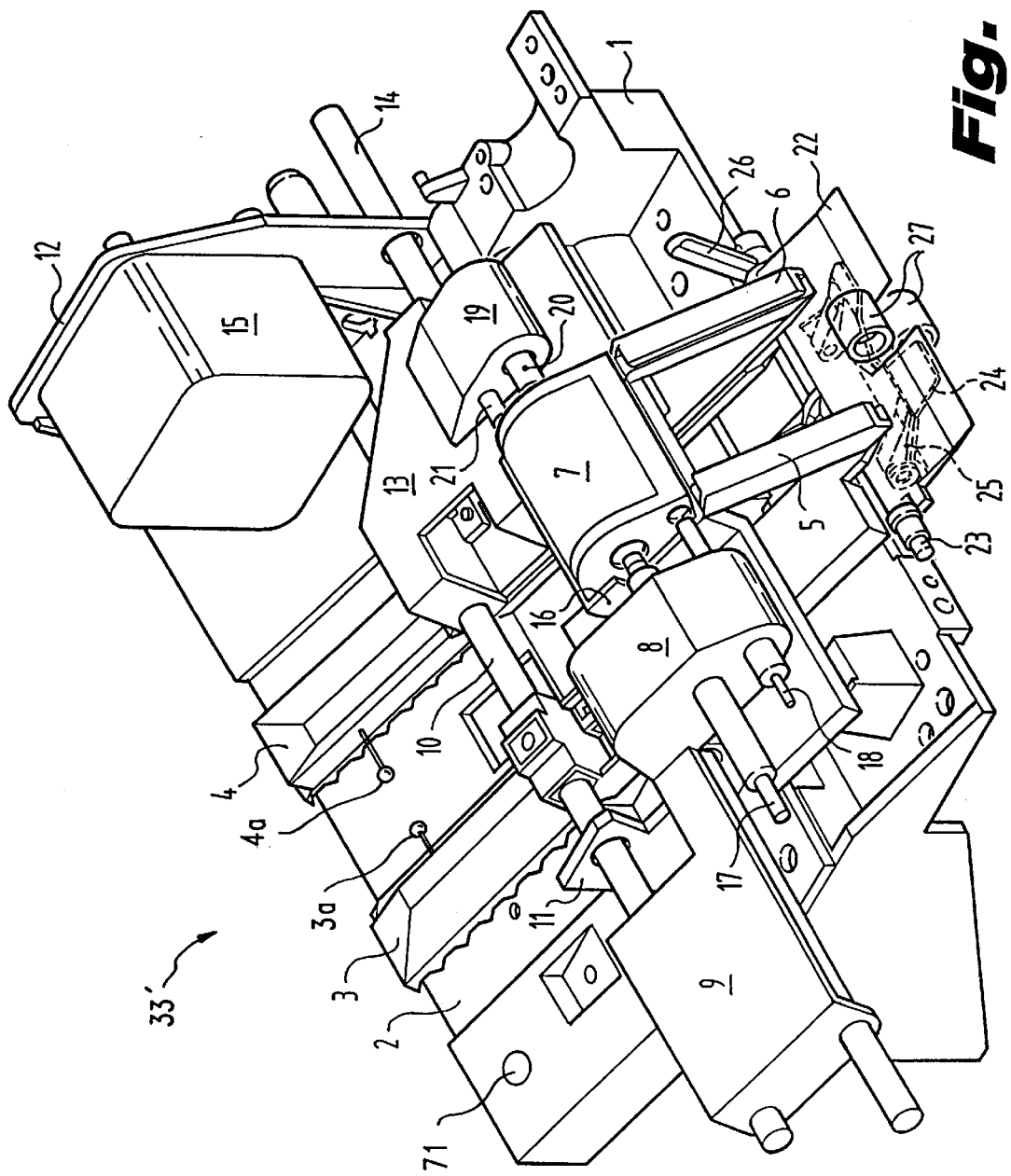
FIG. 3 is a detailed illustration of an entry device forming part of the apparatus of FIG. 2.

The feeding device 33' is illustrated in greater detail in FIG. 3.

With reference to FIG. 3, the feeding device 33' comprises a base plate or support 1 which is provided with a groove 2. A pair of guides or guide members 3 and 4 is disposed in the groove 2, and the guides 3,4 are shiftable towards and away from one another. The guides 3, 4 constitute, or constitute part of, a receiving station for unpackaged filmstrips and are designed to engage the longitudinal edges of a filmstrip. The guides 3,4 define a strip-like guide passage or channel which is aligned with, and functions to direct or guide a filmstrip to, the transport rollers 27.

The feeding device 33' further comprises a holder 16 for a film container 7 which is here in the form of a cartridge. The holder 16 constitutes, or constitutes part of, a receiving station for cartridges and is provided with a compartment having an inner contour which matches the outer contour of a portion of the cartridge 7. The holder 16, which is designed to accept the cartridge 7 only when the latter has a predetermined orientation, is located above the guide channel defined by, and bridges, the guides 3, 4.

A pair of guides or guide members 5 and 6 extends from the vicinity of the transport rollers 27 to the cartridge holder 16. The guides 5, 6 are inclined to the base plate 1, and each of the guides 5, 6 is formed with a guide slot which runs the length of the respective guide 5, 6. The slots are arranged to receive the longitudinal edges of a film emerging from the cartridge 7.

The guides 5, 6 are spaced from one another in the direction of the rotational axes of, and the slots in the guides 5, 6 define a guide passage or channel which is in register with, the transport rollers 27. The guides 5,6 thus serve to direct or guide a film withdrawn from the cartridge 7 to the transport rollers 27. The guide 5 may be fast with the guide 3 while the guide 6 may be fast with the guide 4.

A drive member or block 8 for operating on the cartridge 7 is connected to the guides 3 and 5 by a connecting member 9 and an actuating rod 10. The actuating rod 10 extends through two bearing members 11 and 12 which are fixed to the base plate 1. The actuating rod 10, which is fast with the connecting member 9 and the guide 3, is shiftable axially relative to the bearing members 11, 12.

A second actuating rod 14 extends through the bearing members 11, 12 and is also movable axially relative to the same. The actuating rod 14 is connected to the guides 4 and 6 by a connecting member 13. The actuating rod 10 extends through the connecting member 13, and the connecting member 13 is displaceable relative to the actuating rod 10 in axial direction of the rod 10. Similarly, the actuating rod 14 extends through the connecting member 9 which is shiftable relative to the rod 14 in axial direction thereof.

The actuating rods 10, 14 are movable in opposite directions by a motor 15 and a non-illustrated spindle drive. This allows the guides 3, 5 and the guides 4, 6 to be shifted towards and away from one another symmetrically.

The drive member 8 comprises a shaft 17 for rotating the spool of, and a shaft 18 for opening, the cartridge 7. The shafts 17 and 18 are driven by a non-illustrated motor.

A support member 19 is mounted on the connecting member 13 for movement with the latter. The support member 19 includes a support pin 20 which braces the cartridge 7 as the film from the cartridge 7 is fed to the prescanning device 68 and the main scanning device 69. The support member 19 carries a sensor 21 which determines whether the film in the cartridge 7 has been developed or not.

A flap 22 is located below, and is pivotable on a pivot 23 extending transversely of, the guides 3, 4, 5, 6. A guide or guide member 24 is situated beneath the flap 22 and is pivotable on an axis which parallels the pivot 23. The guide 24 is provided with a pair of slideways 25 which are spaced from one another in the direction of the rotational axes of the transport rollers 27. The guide 24 is urged towards the flap 22 by a spring or other resilient member, and the design is such that the slideways 25 are biased against the flap 22. An operating lever 26 allows the flap 22 to be pivoted upward.

The flap 22 and guide 24 are in alignment with the transport rollers 27 and constitute, or constitute part of, a receiving station for a filmstrip exiting a developing unit. The filmstrip is fed to the flap 22 and guide 24 from below and, in order to receive the filmstrip, the flap 22 is pivoted upward via the lever 26. Due to the biasing action of the resilient member acting on the guide 24, the latter pivots upward as well. The slideways 25 of the guide 24 are arranged to support the longitudinal edges of the filmstrip, and the leading end of the filmstrip is pushed between the slideways 25 and the underside of the flap 22 by drive rollers 31 shown in FIG. 2. When the leading end of the filmstrip is inserted between the slideways 25 and the flap 22, a gap is created intermediate the guide 24 and flap 22. This gap is sufficiently large that there is little or no likelihood of scratching the filmstrip.

The drive rollers 31 advance the filmstrip along the flap 22 and guide 24 which cooperate to direct or guide the filmstrip to the transport rollers 27. Once the leading end of the filmstrip reaches the transport rollers 27, the latter transport the filmstrip past the prescanning device 68 and the main scanning device 69 to the reel 67.

As soon as the trailing end of the filmstrip leaves the gap between the flap 22 and the guide 24, the resilient member acting on the guide 24 urges the guide 24 back into engagement with the flap 22.

During transport of the filmstrip towards the reel 67, the filmstrip is prescanned by the prescanning device 68. When the entire filmstrip has been prescanned, the direction of rotation of the transport rollers 27, and hence the direction of movement of the filmstrip, is reversed. As the filmstrip travels backwards, the filmstrip is scanned by the main scanning unit 69.

Since the gap between the flap 22 and the guide 24 is closed, the leading end of the filmstrip comes into abutment with the underside of the guide 24 when the direction of movement of the filmstrip is reversed. The filmstrip is thus deflected downward along a discharge path extending below the base plate 1. The guide 24 may direct the filmstrip into a suitable receiving chamber.

The processing section in the apparatus of FIG. 2, which includes the prescanning device 68 and the main scanning device 69, may employ a masking plate matched to the format of a film to be processed. As indicated earlier, the entry device 33' is adjustable by way of the motor 15, and the apparatus of FIG. 2 may, for instance, be designed so that adjustment of the entry device 33' is based on the characteristics of the masking plate present in the apparatus.

Referring back to FIG. 3, non-illustrated light barriers generate a signal when the cartridge 7 is properly positioned in the holder 16. Once the cartridge 7 has been properly positioned in the holder 16 and a masking plate matched to the format of the film in the cartridge 7 has been inserted in the apparatus, the motor 15 is activated. The motor 15 moves the drive member 8 and the support member 19 so that the shaft 17 of the drive member 8 is coupled to the spool of, and the support pin 20 of the support member 19 contacts, the cartridge 7. Simultaneously, the guides 5, 6 are shifted such that the slots in the guides 5,6 can receive the edges of the film in the cartridge 7. The positions of the drive member 8 and the support member 19 can be used to check whether the cartridge 7 was, in fact, properly inserted in the holder 16. If this is the case, the sensor 21 determines whether the film in the cartridge 7 has been developed and is no longer sensitive to light.

Assuming that the film has been developed, the cartridge 7 is opened by the shaft 18 of the drive member 8. The shaft 17 coupled to the spool of the cartridge 7 is set in rotation to advance the film from the cartridge 7 to the transport rollers 27 via the guides 5, 6. The film is now prescanned in the prescanning device 68 during a first run from the cartridge 7 to the reel 67. The film is subsequently scanned in the main scanning device 69, and rewound into the cartridge 7, during a second run in the opposite direction. Once the film has been wound back into the cartridge 7, the cartridge 7 is closed via the shaft 18 and the motor 15 moves the drive member 8, the support member 19 and the guides 5,6 away from the cartridge 7.

If next an unpackaged filmstrip, which has a different format than the film in the cartridge 7 and is not obtained directly from a developing unit, is to be processed, the appropriate masking plate is placed in the processing section of the apparatus of FIG. 2. The motor 15 then shifts the guides 3,4 so that the distance between the same equals the width of the filmstrip which may, for example, have a small format or an A110 format. The filmstrip is thereupon placed in the passage defined by the guides 3, 4. This may be accomplished by hand. For more reliable insertion of the filmstrip in the apparatus, and to prevent the filmstrip from entering the guides 5, 6, the cartridge holder 16 may be provided with a cover which is closed before the filmstrip is placed in the apparatus.

The guide 3 is equipped with a reader 3a for the DX code normally provided on a longitudinal edge of the filmstrip while the guide 4 is equipped with a reader 4a for the DX code. Once the filmstrip has been positioned between the guides 3,4, the filmstrip is conveyed past the readers 3a, 4a and towards the transport rollers 27 at a set speed by drive rollers 30 shown in FIG. 2. The readers 3a, 4a scan the longitudinal edges of the filmstrip to detect the DX code. Upon detection of the DX code, the orientation of the filmstrip can be determined from the position of the code and a knowledge of which reader 3a, 4a detected the same. If the filmstrip is oriented improperly, a warning element or alarm element 71 illustrated in FIG. 3 alerts the operator so that the orientation of the filmstrip may be corrected.

When the filmstrip is oriented properly, the drive rollers 30 advance the filmstrip to the transport rollers 27. The filmstrip is thereupon prescanned by the prescanning device 68 during a first run from left to right in FIG. 2. During a second run in the opposite direction, the filmstrip is scanned by the main scanning device 69.

The filmstrip need not return to the drive rollers 30 and the guides 3,4 following prescanning and scanning. Thus, it is possible to deflect the filmstrip downward to a receiving chamber via the guide 24 as outlined previously for a film extracted from a developing unit. On the other hand, a film obtained from a developing unit may be directed to the drive rollers 30, instead of being deflected by the guide 24, when the direction of movement of the film is reversed.

The prescanning device 68 serves to establish the density range of a film which is then used to optimally adjust the main scanning device 69. The main scanning device 69, in turn, generates density values to be employed in calculating the amounts of copy light.

The prescan and main scan can be carried out during a single run of a film through the apparatus of FIG. 2, that is, both the prescan and the main scan can be performed as a film travels in a given direction. The prescanning device 68 and main scanning device 69 are here preferably separated by a distance which is at least equal to the length of the longest film frame to be processed.

Film fed to the transport rollers 27 from the cartridge 7 travels along a first path while film fed to the transport rollers 27 from the guides 3, 4 travels along a second path. Film fed to the transport rollers 27 from a developing unit travels along a third path. These paths have an intersection 72 in the vicinity of the transport rollers 27 as illustrated in FIG. 2.

The main scanning device 69 is provided with a scanning slit through which light used for scanning enters the device 69. The distance between the intersection 72 and the left-hand edge of the scanning slit, plus the distance between the intersection 72 and the mouth of a cartridge in the holder 16, advantageously does not exceed 119 mm. For current film cartridges, this assures that the last frame of a cartridge can reach and be scanned by the main scanning device 69.

The measuring cells in the prescanning device 68 and the main scanning device 69 can be arranged in a two-dimensional array or a linear array.

The scanning device 48 of FIG. 1 can be incorporated in the apparatus of FIG. 2. Under such circumstances, both the prescanning device and main scanning device can be located in the housing 49 and the same light source, as well as the same optics, can be employed for the two devices. The measuring cells 54a, which generate a gray value, may here be used for prescanning. Alternatively, the prescan and main scan may each be carried out with the entire arrangement of measuring cells 54a–54d.

Although prescanning does not require high resolution, it is necessary for the measuring cells to have a large dynamic range. Therefore, for each array of measuring cells, several individual pixels must be combined to produce a "macropixel" whose signal has a magnitude sufficient to distinguish the signal from background noise. This enables the signal to be better differentiated during analysis. The measuring cells are adjusted for the main scan on the basis of the values obtained from the prescan and, during the main scan, the full resolution of the measuring cells is employed.

When the prescanning device and the main scanning device are combined in a unit which can be switched between a prescanning condition and a main scanning condition, the prescan and main scan will normally be carried out during different runs of a film past the unit. As is the case for the apparatus of FIG. 2, different types of film are here handled in the same manner so that errors will seldom, if ever, arise. Thus, the operation of an apparatus in which the prescanning device and the main scanning device are combined in a unit is as follows:

1. An unpackaged filmstrip or a film cartridge is inserted in a respective receiving station.
2. The filmstrip or the film from the cartridge makes a first run past the combined unit in a predetermined direction and a prescan is performed during the run.
3. The filmstrip or the film makes a second run past the combined unit in a direction counter to the predetermined direction and a main scan is carried out during such run.
4. The filmstrip or the cartridge is removed from the apparatus following the prescan and main scan.

A cartridge is always removed from the apparatus at the location where it was inserted in the apparatus. An unpackaged filmstrip may, but need not be, inserted in and withdrawn from the apparatus at one location.

The transport rollers 44, as well as the transport rollers 45 and the transport rollers 27, may be movable as a unit. Furthermore, the transport rollers 44, 45, 27 may be replaceable and/or interchangeable.

A blocking device may be provided for one or more of the receiving stations to prevent insertion of a filmstrip or film cartridge in the respective station. The numeral 73a in FIG. 1 denotes a blocking device for the receiving station 36 while the numeral 73b identifies a blocking device for the receiving station 35.

Various modifications are possible within the meaning and range of equivalence of the appended claims.

We claim:

1. An apparatus for processing photographic material, comprising a pair of processing units; means for transporting photographic material from a predetermined location to both of said processing units; and means for delivering photographic material to said predetermined location, said delivering means including first means for directing photographic material to said predetermined location along a first path and second means for directing photographic material to said predetermined location along a second path, said first means including means for withdrawing photographic material from a container; and means for detecting the orientation of photographic material in said delivering means.

2. The apparatus of claim 1, wherein said withdrawing means is designed to withdraw photographic material from a container at a selected location, each of said processing units having at least one operating position, and the distance between said selected location and either of said processing units being at most 119 mm in any operating position.

3. The apparatus of claim 1, wherein one of said processing units comprises a prescanning device and the other of said processing units comprises a main scanning device.

4. The apparatus of claim 1, wherein one of said processing units comprises a device for measuring a characteristic of photographic material and the other of said processing units comprises a copying device.

5. The apparatus of claim 1, further comprising means for accommodating containers of photographic material, said accommodating means being designed to accept the containers in a single orientation only.

6. The apparatus of claim 1, wherein said second means comprises means for receiving photographic material from a developing unit.

7. The apparatus of claim 1, further comprising means for generating a signal in response to detection of an orientation different from a predetermined orientation.

8. The apparatus of claim 1, further comprising means for accommodating containers of photographic material, said detecting means including a detector for detecting the orientations of the containers.

9. The apparatus of claim 1, wherein said first means and said second means are mounted at fixed locations.

10. The apparatus of claim 9, wherein said first path and said second path are each in permanent communication with said transporting means.

11. The apparatus of claim 10, wherein said first path and said second path intersect adjacent said transporting means.

12. The apparatus of claim 1, wherein said second means comprises an adjustable flap-like member.

13. The apparatus of claim 1, wherein said transporting means is displaceable.

14. The apparatus of claim 1, wherein said transporting means is exchangeable with another transporting means.

15. The apparatus of claim 1, wherein said second means comprises means for withdrawing photographic material from a magazine.

16. The apparatus of claim 1, further comprising means for preventing the acceptance of photographic material by said first and second means.

17. An apparatus for processing photographic material, comprising a pair of processing units; means for transporting photographic material from a predetermined location to both of said processing units; means for delivering photographic material to said predetermined location, said delivering means including first means for directing photographic material to said predetermined location along a first path and second means for directing photographic material to said predetermined location along a second path, said first means including means for withdrawing photographic material from a container; and control means for said processing units, said transporting means and said delivering means, said control means being programmed to cause photographic material to perform at least two runs by said processing units, and said control means also being programmed to activate one of said processing units during a first run and the other of said processing units during a second run.

18. The apparatus of claim 17, wherein said control means is programmed so that the photographic material moves in opposite directions during the first and second runs.

19. An apparatus for processing photographic material, comprising a pair of processing units; means for transporting photographic material from a predetermined location to both of said processing units; and means for delivering photographic material to said predetermined location, said delivering means including first means for directing photographic material to said predetermined location along a first path and second means for directing photographic material to said predetermined location along a second path, said first means including means for withdrawing photographic material from a container, and said second means comprising means for receiving photographic material from a developing unit, said delivering means further including third means for directing photographic material to said predetermined location along a third path, and said third means being designed to define a passage for photographic material in the form of strips.

20. An apparatus for processing photographic material, comprising a pair of processing units; means for transporting photographic material from a predetermined location to both of said processing units; and means for delivering photographic material to said predetermined location, said delivering means including first means for directing photographic material to said predetermined location along a first path, second means for directing photographic material to said predetermined location along a second path, and a carriage movable between a first position in which said first path communicates with said transporting means and a second position in which said second path communicates with said transporting means, said first means including means for withdrawing photographic material from a container.

* * * * *